United States Patent Office 3,367,398
Patented Feb. 6, 1968

3,367,398
METHOD OF PREVENTING SEGREGATION DURING CASTING OF COMPOSITES
Robert E. Riley and Haskell Sheinberg, Los Alamos, N. Mex., assignors to the United States of America as represented by the United States Atomic Energy Commission
No Drawing. Filed Oct. 19, 1965, Ser. No. 498,166
4 Claims. (Cl. 164—97)

The present invention relates to casting and, more particularly, to a method of preventing segregation during casting. The invention described herein was made in the course of, or under, a contract with the U.S. Atomic Energy Commission.

A composite is a material wherein particles are incorporated in a matrix of a different composition and both materials may have widely differing densities. These composites are being used increasingly (e.g., in nuclear reactor control or poison plates of boron carbide in copper or europium oxide in steel, dispersion hardened materials such as dispersion hardened nickel). A problem encountered in fabricating these composites is found in preventing segregation of particles which are of greatly different density than the matrix material. The problem is particularly aggravated when using large, light particles in a high density matrix.

The present inventors have solved this problem by coating the particles to be incorporated with a material chemically inert to the powder and matrix material and which is of a density selected so that the average density of the coated particle will be approximately that of the matrix material.

Accordingly, an object of the present invention is to provide a method of preventing segregation of particles in a matrix of different density.

The invention is illustrated by the following examples which fall within the scope of the invention but which are not to be considered limitative.

Examples

Two grades of copper were used. The first, of one micron average size, was heated in dry hydrogen for two hours at 380–390° C. and screened −325 mesh prior to blending. The second was of 7.5 micron average particle size and was heated for two hours in dry hydrogen at 400–420° C. and screened −200 mesh prior to blending.

The boron carbide was −100+230 (U.S.S.) mesh, minimum B+C=99%, particle density=2.48 g./cc. minimum. This material was heated to 950° C. in dry hydrogen for one hour prior to being coated.

Fifty gram lots of boron carbide powder were coated with tungsten using the reduction of $WF_6$ with $H_2$ in a fluidized bed. The powder was heated to between 500 and 600° C. while being fluidized by the $WF_6$-$H_2$ gas stream. The normal operating pressure was 10 in. Hg absolute. The principal variables for controlling the tungsten coating thickness were operating time and gas flow. The amount of tungsten coating was varied between 17 w./o. (weight percent) tungsten and 74 w./o. tungsten as estimated by the weight change of powder during the coating operation. Particle density was measured with an air comparison pycnometer. The particle density of the boron carbide before coating was 2.5 g./cc.

The normal procedure for preparing Cu-W coated $B_4C$ for pressing consisted in:

(1) Weighing out the proper proportion of reduced Cu and of the W coated $B_4C$ for a 20 w./o. uncoated $B_4C$ concentration in the Cu matrix.

(2) The powders were normally blended for four hours in a glass bottle at approximately 60 r.p.m. with Al agitator wires.

(3) The blended powders were loaded and tamped into a 1½ in. I.D. plastisol tube and isostatically pressed at 30,000 or 50,000 p.s.i.

(4) The pressed piece was loaded into a graphite crucible, heated and cast when molten into a graphite die. Casting was done into a four-pole, heated graphite crucible at about 1150° C. with power on. An inert gas atmosphere was utilized.

Example I.—The materials (70.7 grams of the 7.5 micron copper and 21 grams of $B_4C$ coated with about 70 w./o. tungsten) were blended for four hours in a glass bottle at about 60 r.p.m. with agitator wires. The blended powder was cast in a graphite crucible and mold assembly by heating moderately to 1150° C., holding for two minutes and casting with power on. An argon atmosphere was maintained in the crucible during the entire run.

Example II.—The materials (560.9 grams of the fine copper and 65.1 grams of $B_4C$ coated with about 25 w./o. tungsten) were blended for four hours with wires. The blended powders were then placed in a 1.25 in. I.D. x 8.24 in. plastisol sac and pressed at 30,000 p.s.i.g. The pressed dimensions were 1.101 in. diam. by 7.10 in. long. The pressed material was then available for casting by the method described above. Other examples are shown in the following table:

| Run No | 2 | 3 | 4 | 5 |
| --- | --- | --- | --- | --- |
| Cu | Fine | Fine | Fine | Fine |
| Wt. of Cu, G | 142.0 | 560.9 | 321.3 | 560.9 |
| Wt. of W-$B_4C$, G | 20.5 | 65.1 | 71.2 | 65.1 |
| W-w./o. of $B_4C$ | 42 | 40 | 68 | 71 |
| Time blended, hrs | 2 | 4 | 2 | 4 |
| Isostatic Pressure, p.s.i | 50,000 | 30,000 | 50,000 | 30,000 |

Example III.—The $B_4C$ was coated with about 5 w./o. Cu by the silver mirror technique and then blended with copper in the proportion 18.21 g. Cu and 1.29 g. Cu coated $B_4C$. After blending for two hours with wires the material may be pressed before casting or may also be sintered (at about 1000° C. for two hours in hydrogen).

It is seen that in the Cu-W coated in $B_4C$ system the adjusted densities of the tungsten-coated $B_4C$ vary between 0.36 and 0.77 times the density of copper. Throughout this range, improved results are obtained over those obtained using uncoated $B_4C$. In addition, it will be noted that even the slight density increase of Example III decreases the segregation of composites. The best results are, of course, obtained when the densities are nearly equal.

What is claimed is:

1. The method of preparing a Cu-$B_4C$ composite for casting comprising heating a $B_4C$ powder to about 950° C. in dry hydrogen gas for about one hour, coating the $B_4C$ powder with tungsten by reducing with a $WF_6$-$H_2$ gas stream in a fluidized bed, said powder being heated to between about 500° C. and 600° C., the amount of tungsten coating applied being between about 17 and 74 weight percent of the tungsten-coated boron carbide particles, reducing a Cu powder, mixing the Cu powder and tungsten-coated $B_4C$ powder and blending, sufficient tungsten-coated $B_4C$ being included in the mixture to provide about a 20 weight percent uncoated $B_4C$ concentration in the Cu matrix.

2. The method of claim 1 wherein the powders are blended by agitating for about four hours using aluminum agitator wires at approximately 60 r.p.m.

3. The method of claim 2 wherein the blended powders are then loaded and tamped into a flexible tube and isostatically pressed at between about 30,000 to 50,000 p.s.i.

4. The method of claim 3 wherein the pressed piece is then loaded into a graphite crucible, heated until molten and then charged into a heated graphite crucible.

References Cited

UNITED STATES PATENTS

| 2,349,052 | 5/1944 | Ollier | 75—224 X |
| 3,247,557 | 4/1966 | Schmidt | 22—202 X |
| 604,569 | 5/1898 | Ringstrom | 22—202 X |
| 2,752,666 | 7/1956 | Goetzel et al. | |
| 2,828,226 | 3/1958 | Goetzel et al. | 22—202 X |
| 3,175,260 | 3/1965 | Bridwell et al. | 22—202 |

OTHER REFERENCES

"Tungsten and Molybdenum Coated Nonmetallic Powder," A. Landsberg et al., Journal of Metals, August 1965, pp. 850–855, copy in 22/202.

J. SPENCER OVERHOLSER, *Primary Examiner.*

V. K. RISING, *Assistant Examiner.*